Feb. 16, 1937.  W. F. ARNDT ET AL  2,070,773

ICE PICK

Filed Aug. 3, 1935

Inventors,
William F. Arndt and
John N. Ganzer,
BY
Wm. O. Bell
Attorney.

Patented Feb. 16, 1937

2,070,773

UNITED STATES PATENT OFFICE 2,070,773

ICE PICK

William F. Arndt and John H. Ganzer, Duluth, Minn., assignors to The Coolerator Company, Duluth, Minn., a corporation of Minnesota Application August 3, 1935, Serial No. 34,495

3 Claims. (Cl. 125—23)

This invention relates to ice picks and it has for its object to provide a simple and convenient device for removing ice cubes which have been formed on a cake of ice and disposing of them as desired.

Another object of the invention is to provide an ice pick which is capable of being used for separating one or more ice cubes which have been formed on a cake of ice and for holding them while the cubes are being washed and deposited in a glass or other receptacle.

In the accompanying drawing illustrating a selected embodiment of the invention

Figure 1:
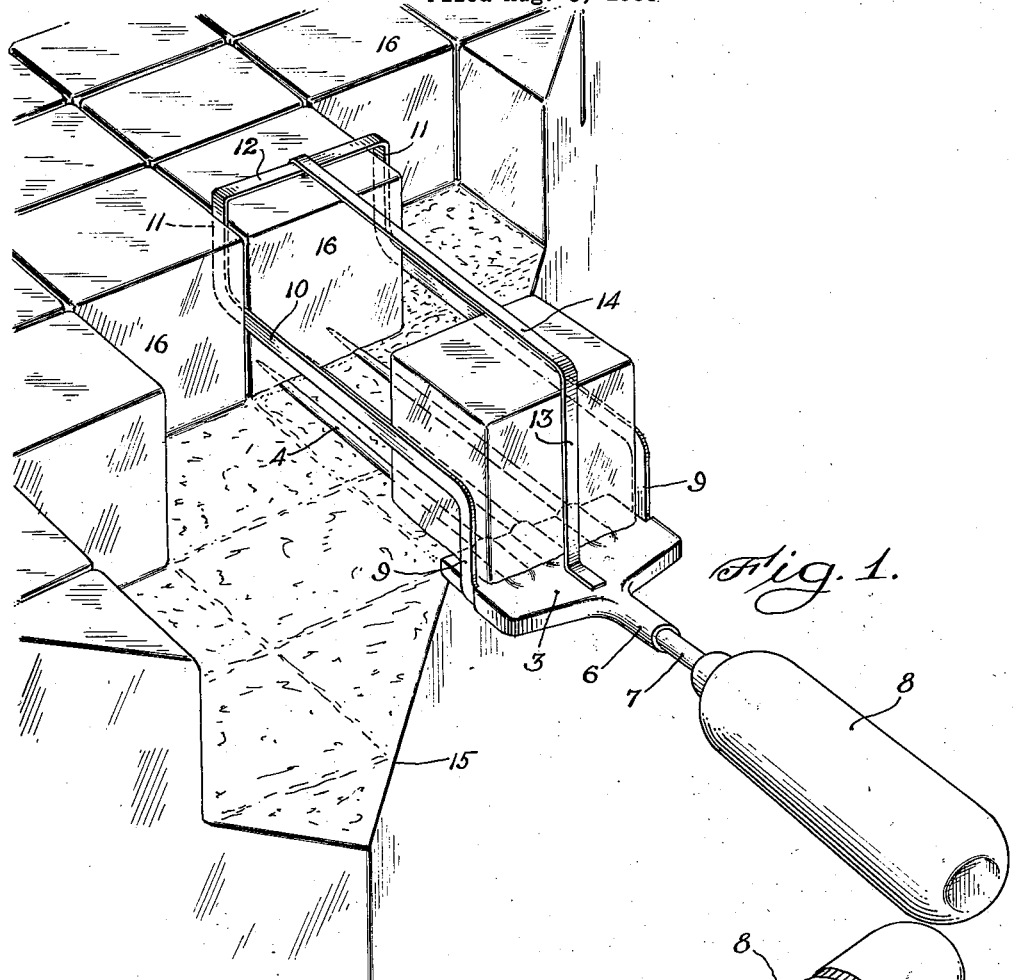
Figure 2:
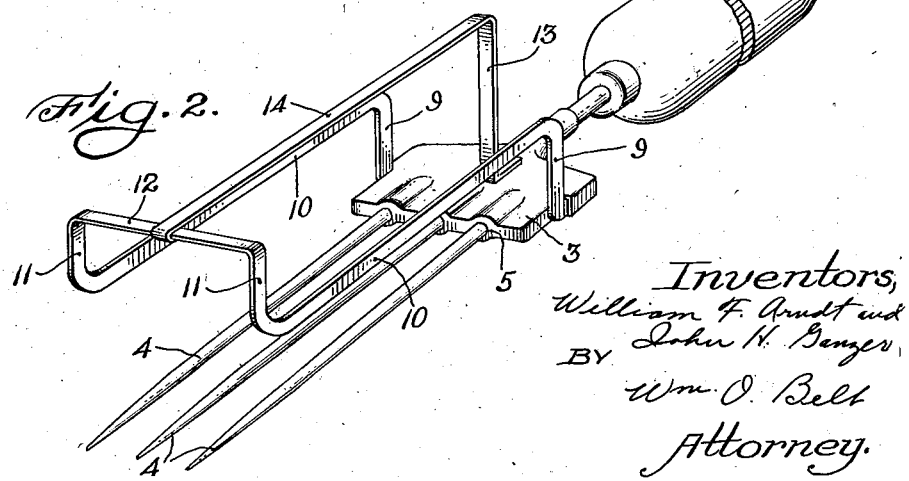

Fig. 1 is a perspective view showing the pick in position for separating one cube from a cake of ice and with another cube previously separated stored in the pick; and Fig. 2 is also a perspective view of the pick.

Referring to the drawing the pick comprises a base 3 of suitable size and shape and a plurality of prongs 4 secured to the base and projecting forwardly therefrom in parallel relation. In the drawing the base is shown provided with sockets 5 extending from the front edge of the base a suitable distance to receive the ends of the wire prongs which are securely seated therein. The rear edge of the base is provided with a socket 6 in which the shank 7 of a handle 8 is securely seated.

A retainer is mounted on the base and this retainer, as shown in the drawing, comprises rear upright bars 9 which are secured at their lower ends to the base, side bars 10 which project forwardly from the upper ends of the rear upright bars, front upright bars 11 which project upwardly from the front ends of the side bars, a cross bar 12 which connects the upper ends of the front upright bars, an end upright bar 13 which is fastened at its lower end to the base, and a top bar 14 which extends forwardly from the upper end of the end upright bar to the cross bar 12 to which it is connected. The retainer is open at its front end and closed at its rear end and the bars are spaced to receive a cube formed on a cake of ice. Side bars 10 are arranged about midway between the plane of the prongs and the plane of the top bar to engage the ice cube about the middle of its sides. The end bar and the top bar are positioned to engage the ice tube about the middle of its end and top. The forward end of the retainer is preferably extended a little beyond the pointed ends of the prongs so that the retainer may be engaged with the ice cube to act as a guide for the pick before the prongs enter the ice.

The invention is intended for separating and removing ice cubes which have been formed by a cuber on a cake of ice. In Fig. 1 we have shown a cake of ice 15 with a plurality of cubes 16 thereon, these cubes being separated from each other at their sides and connected with the cake at their bottoms. The ice pick is employed for separating the cubes individually from the cake and holding one or more cubes while being removed from the cake to be washed or deposited where desired. The forward end of the retainer is engaged with the cube and then the pick is thrust forward, the prongs entering the ice at the base of the cube and prying the cube from the cake. The separation can be easily accomplished by moving the pick back and forward or by applying pressure upon the pick and lifting the handle end slightly if required. When the cube is separated from the cake it will be resting upon the prongs within the retainer and it can be slipped backward in the retainer to rest against the end bar 13. Then another cube may be separated and if the pick is designed to hold two cubes these cubes may be carried to a water faucet to be washed and may then be deposited in a glass, pitcher or other receptacle. The retainer prevents the cubes from falling off the cake when separated therefrom and provides a simple and convenient device for holding them while being carried from the ice box to a place for use. The pick may be made in different sizes to accommodate one, two or more cubes, the number of prongs may be varied as found desirable, and the retainer may be modified in size and shape as required; and other changes in the form, construction and arrangement of parts may be made, without departing from the spirit of the invention, within the scope of the following claims.

We claim:

1. An ice pick comprising a base, a prong projecting forward and a handle projecting rearward from the base in alinement with each other, and a retainer mounted on the base and projecting forwardly above the prong, said retainer having side bars, a top bar parallel to each of the side bars and a cross bar all connected with each other to slidably engage the top and sides of an ice cube on a cake of ice for holding the ice cube after it is separated by the prong from the cake of ice.

2. An ice pick comprising a base, a prong projecting forward and a handle projecting rearward from the base in alinement with each other, and a retainer mounted on the base and projecting forwardly above the prong for holding an ice cube after it is separated by the prong from the cake of ice, said retainer comprising side bars, rear upright bars connecting the side bars to the base, a cross bar at the front of the retainer, and front upright bars connecting the side bars to the cross bar, the side bars and prong being parallel to each other.

3. An ice pick comprising a base, a prong projecting forward and a handle projecting rearward from the base in alinement with each other, and a retainer mounted on the base and projecting forwardly above the prong for holding an ice cube after it is separated by the prong from the cake of ice, said retainer comprising side bars, rear upright bars connecting the side bars to the base, a cross bar at the front of the retainer, front upright bars connecting the side bars to the cross bar, an end upright bar on the base, and a top bar connected to the cross bar and to the end upright bar, the side bars, top bar and prong being parallel with each other to form an open ended substantially square prismatic cage.

WILLIAM F. ARNDT.
JOHN H. GANZER.